Oct. 3, 1961

M. T. BAKER ET AL 3,002,735

VACUUM FURNACE

Filed July 1, 1957

WITNESSES
Edwin E. Bassler
Ernest P. Klipfel

INVENTORS
Marvin T. Baker &
Roger R. Giler
BY
ATTORNEY

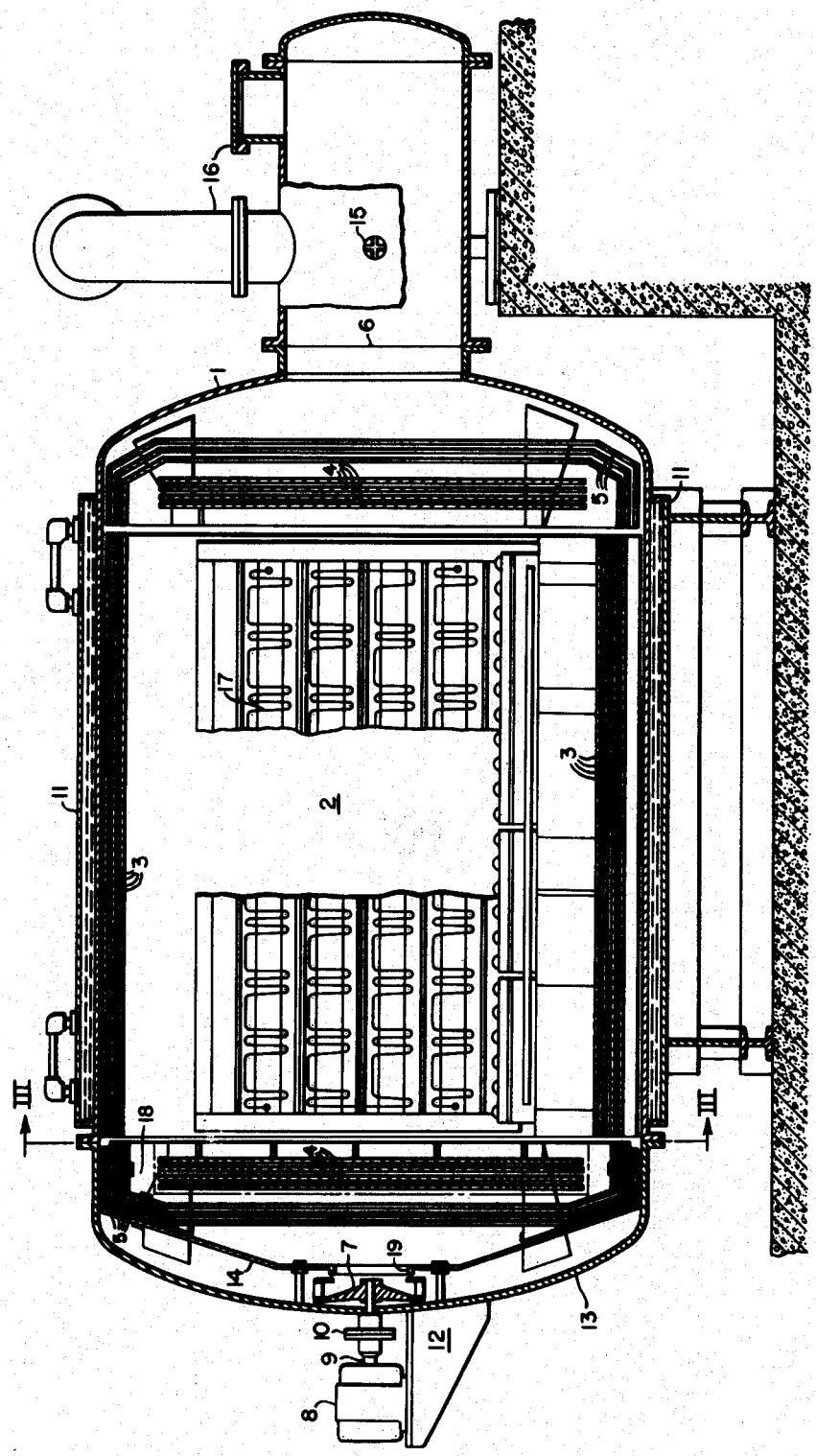

United States Patent Office 3,002,735
Patented Oct. 3, 1961

3,002,735
VACUUM FURNACE
Marvin T. Baker, Meadville, and Roger R. Giler, East Fairfield Township, Crawford County, Pa., assignors, by mesne assignments, to Sunbeam Equipment Corporation, a corporation of Delaware
Filed July 1, 1957, Ser. No. 669,036
1 Claim. (Cl. 263—40)

The present invention relates to vacuum furnaces, and more particularly to an improved construction for cooling a vacuum furnace after the charge has completed its heating cycle, facilitating the cooling of the furnace before removal of the work.

The type of furnace to which our invention relates consists of a housing or outer shell, usually water cooled. Within the housing, the work is enclosed by a heating means and radiation shields are disposed between the heating means and the furnace housing for containing and concentrating the heat at the work. Such a furnace operates with a high vacuum within the housing so substantially all of the heat generated can be concentrated at the work by reflection from the shields.

Upon completion of a heating cycle, the vacuum heat treating furnace must be cooled before the work is withdrawn. However, the radiation shields reflect and concentrate the heat within the work chamber so effectively that an excessively long time would be required for cooling the work. The cooling of the work prior to its withdrawal from the furnace is particularly important in the heat treating of metals such as titanium and zirconium which very readily oxidize when exposed to atmosphere at high temperatures. Because of this, the work cannot be rapidly cooled by merely opening up the furnace door. Control of the length of time for cooling the work may also be important for metallurgical reasons since the grain structure may be altered through too long or too short a cooling period. Further, if the internal radiation shields of the heat treating furnace are allowed to oxidize, the reflectivity of the shields will decrease, thereby increasing the losses within the furnace to a point where its operation would be uneconomical. Oxidized radiation shields have a greatly reduced ability to reflect heat back to the work charge since the radiation shields will absorb the heat thereby reducing the efficiency of the entire furnace.

Furnaces of the type under discussion have heretofore been cooled by circulating an inert coolant gas, such as argon or helium, through the furnace by means of an external heat exchanger and blower system. An external heat exchanger and blower system adds greatly to the initial cost and operating expense. Valves on the inlet side of the external heat exchanger must be of a special and expensive design to withstand the high temperature of the gases at the inlet point. An increased probability of gas leaks is inherent in any external auxiliary heat exchanger system.

The principal object of our invention is to provide a vacuum heat treating furnace which can readily be cooled by circulation of an inert gas without requiring a cumbersome and expensive external heat exchanger system with the seals, valves and pumps heretofore used.

Another object of our invention is to provide means for preventing the oxidation of the internal radiation shields within a vacuum heat treating furnace thereby maintaining the high reflectivity of the radiation shields.

A further object of our invention is to provide a furnace construction whereby the water jacketed shell of the furnace itself can be used as heat exchanging means for the cooling medium.

Our invention will be more fully understood from the following detailed description, taken in connection with the accompanying drawings, in which:

FIG. 2 is a vertical longitudinal section of a vacuum heat treating furnace embodying our invention.

Figure 1:
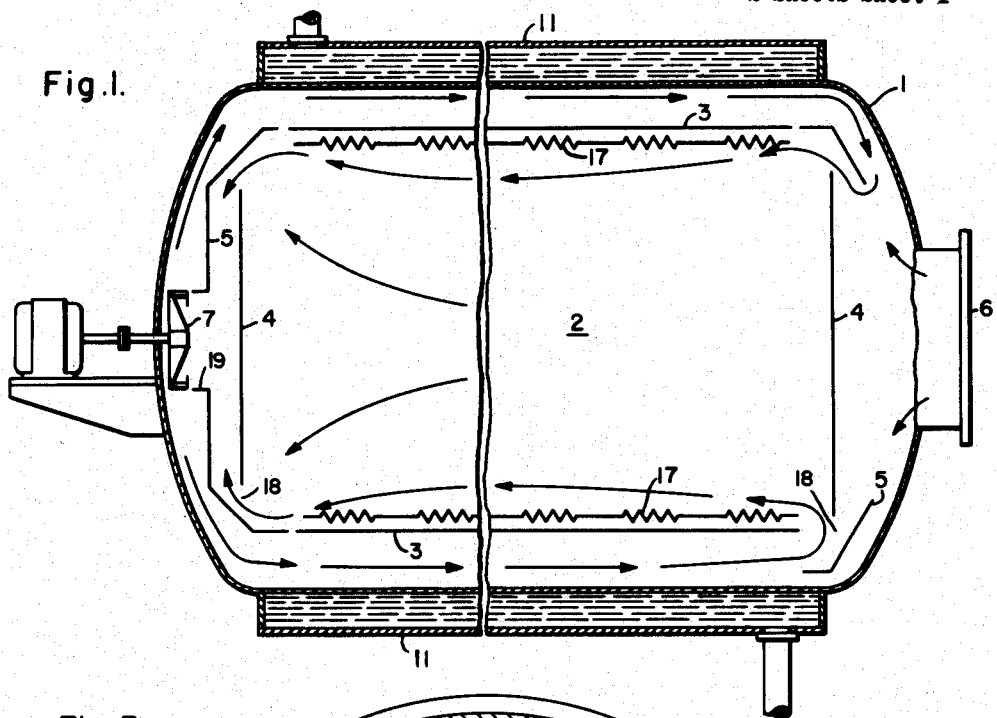
FIGURE 1 is a schematic diagram illustrating the principle of operation and functioning of our invention.
Figure 3:
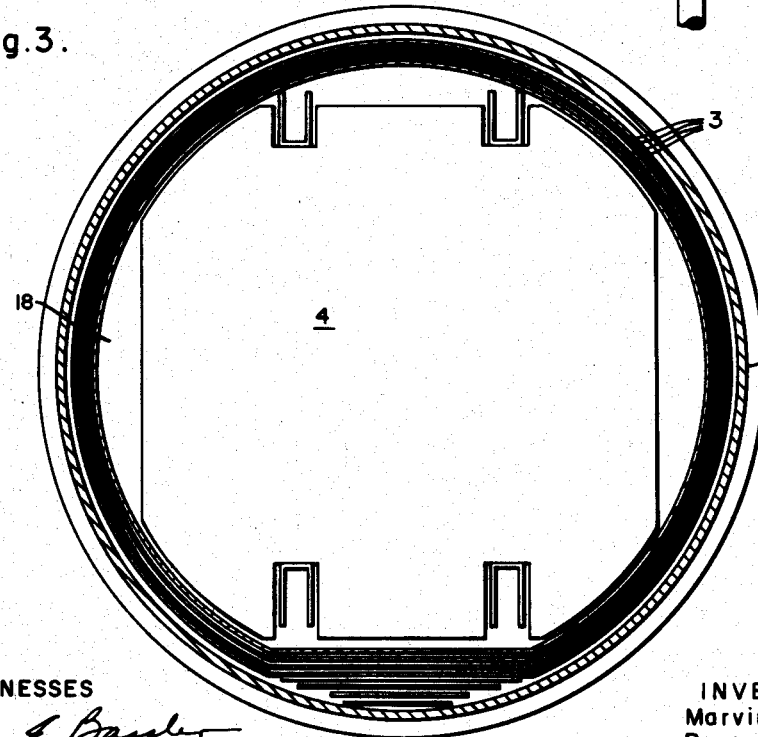
FIG. 3 is a vertical sectional view looking into the end of the vacuum heat treating furnace substantially on the line III—III in FIG. 2.

FIG. 1 is a schematic illustration of the principle of our invention. This figure shows diagrammatically a retort or furnace shell 1 enveloping a work chamber 2. The furnace contains radiation shields 3, 4 disposed within the furnace shell 1 to define the work chamber 2, the preferred arrangement and construction of the shields being as disclosed and claimed in our copending application Serial No. 669,037, filed July 1, 1957, although any suitable configuration might be utilized. The work chamber may be heated by conventional ribbon heating elements 17 mounted on rack supports. The serpentine configuration of the ribbon heating elements is shown schematically in FIG. 2, and they are positioned along the inner surface of members 3. As indicated schematically in FIG. 1, generally cylindrical longitudinal shields 3 with spaced end shields 4 at each end of the longitudinal shields 3 are arranged to permit passage of coolant gas into the work chamber by virtue of end openings 18 therebetween. However, any suitable configuration of radiation shields can be used. Secondary radiation shields 5 are disposed to assist the passage of the coolant gas and also to back up the openings 18 so that no straight line path for radiation losses to the furnace shell 1 exists. Coolant gas can be admitted into the furnace by means shown as a flange 6, with a fan 7 at the other end of the furnace providing means for propelling the coolant gas within the furnace.

As stated previously, a serious disadvantage of vacuum heat treating furnaces of the type under discussion has been the cumbersome and expensive external auxiliary heat exchanger heretofore employed for cooling the coolant gas during the cooling cycle. Our invention utilizes the water jacketed shell 11 which, in the usual construction, encases the retort or furnace shell 1. At the beginning of the cooling cycle, upon completion of the heating cycle, the coolant gas is admitted to the furnace through the flange 6 and at the same time the centrifugal fan 7 is started. Upon entry of the coolant gas, the centrifugal fan 7 propels the coolant gas in paths substantially as indicated by the arrows in the figure, the radiation shields serving as baffles to direct and control the flow of coolant gas.

The coolant gas is thus drawn through the work chamber 2 and over the work and along the heating elements 17, thereupon being discharged from the fan 7 and directed along and across the internal surface of the water jacketed shell 11 in heat exchange relation therewith so that heat is absorbed from the coolant gas by the water jacketed shell 11. The coolant gas is then directed to return into the work chamber 2 and continues to flow through the furnace until it is cooled sufficiently for the furnace to be opened. In this way, the radiation shields have a dual function of also serving as baffles to direct and control the flow of coolant gas. It will be seen, therefore, that the furnace housing itself is used as a self-contained heat exchanger thereby eliminating the necessity of a bulky external heat exchanger with its attendant disadvantages.

FIG. 2 shows an illustrative actual embodiment of our invention wherein corresponding elements to those of FIG. 1 are identified by the same reference numbers. The retort or furnace shell 1 is encased by a water jacket 11 thereby supplying heat exchanger means. The construction of the furnace and arrangement of the radiation shields are shown as being the same as the construction disclosed and claimed in the copending application mentioned above. As more fully described in that application, generally cylindrical radiation shields 3 with spaced end radiation shields 4 at each end, backed up by secondary radiation shields 5, enclose the work chamber 2. A centrifugal fan 7 driven through a drive shaft 9 and coupling 10 by appropriate means, herein shown as an electric motor 8 mounted on a bracket 12 on the furnace door 13, forces circulation of the inert coolant gas through the furnace. The outside radiation shield 14 of the secondary radiation shield assembly 5 is extended to the periphery of the centrifugal fan 7 as shown to provide a shroud for the fan. The outside radiation shield 14 has the important dual function of directing heated coolant gas from the work chamber 2 to the centrifugal fan 7 through its opening 19 and also serving to form a passageway to the water jacketed shell 11 for the heated coolant gas after discharge from the centrifugal fan 7. After absorption of heat from the coolant gas by the water jacketed shell 11, the gas is directed by the radiation shields to return back into the work chamber 2 and continues to flow through the furnace until the furnace is cooled sufficiently for it to be opened. The coolant gas from the gas valve 15 may be admitted at the beginning of the cooling cycle by the same flange 6 through which the furnace is pumped down by any suitable vacuum system connected to the pipes 16 during pump down and degassing.

In operation, at the start of the coolant cycle after completion of the heating cycle, coolant gas is admitted to the furnace, and at the same time the fan 7 is started, with resultant gas flow through the furnace in the manner described above in connection with FIG. 1.

From the foregoing it is readily apparent that our invention has provided an improved means for cooling a vacuum furnace in preparation for withdrawal of the work after the heating cycle has been completed. This new system, utilizing the existing structure of the furnace itself, eliminates the need for an external heat exchanger, special valves or additional piping. With the elimination of the external system, there is also eliminated the possibility of potential leaks within that system. Further, the work is protected from exposure to the atmosphere while at a temperature at which it would oxidize. Use of an inert coolant gas as the coolant medium and isolation of the internal parts of the furnace also reduce oxidation of the radiation shields or baffles thereby keeping the reflectivity of the internal radiation shields at a high level.

While we have described our invention with a certain degree of particularity, it is understood that any variations or modifications within the scope of our invention are meant to be included. While we have shown the water jacketed shell 11 as extending along the cylindrical portion of the furnace, it is understood that the heat exchanger could be made an integral part of the furnace in many ways. The water jacketed shell 11 employed as an integral heat exchanger could be made to extend along the ends of the furnace as well as the sides. It is equally obvious that variations in the baffle system shown may be accomplished to attain the coolant gas flow described and all such modifications are within the scope of our invention.

We claim as our invention:

A vacuum furnace comprising an uninsulated generally cylindrical metallic housing sealed at vacuum pressure and enclosing a work chamber, radiant heating means in said chamber, said housing including externally mounted cooling heat exchange means, means for admitting a coolant gas into the furnace to cool the same, fan means within the furnace for propelling the coolant gas, and baffles between the heating means and the housing, said baffles defining said work chamber and including generally cylindrical metallic longitudinal members, substantially vertical metallic end members disposed at each end adjacent to but spaced from said cylindrical members, said end members conforming generally to the cross-sectional shape of said cylindrical members but having portions of their peripheries shaped to provide openings for the flow of coolant gas therebetween, and generally cup-shaped metallic secondary baffle members having a cylindrical peripheral portion and a conical section with the apex portion of the cone removed, said secondary members being disposed opposite said openings at each end of said cylindrical members to back up the same but being spaced therefrom to permit the passage of coolant gas therethrough, said baffles being disposed in spaced relationship to said housing and a metallic generally cone-shaped shroud extending from adjacent the secondary baffles at one end of said cylindrical members toward said fan means with an opening at said fan means to direct the coolant gas through the work chamber and fan means and over said heat exchange means in heat transfer relation therewith.

References Cited in the file of this patent

UNITED STATES PATENTS

| | | |
|---|---|---|
| 1,794,151 | Cope | Feb. 24, 1931 |
| 1,825,790 | Hansen | Oct. 6, 1931 |
| 2,404,060 | Hall et al. | July 16, 1946 |
| 2,611,790 | Koch | Sept. 23, 1952 |